No. 686,454. Patented Nov. 12, 1901.
R. H. HEARN.
SHAFT COUPLING AND ANTIRATTLER.
(Application filed Apr. 1, 1901.)
(No Model.)
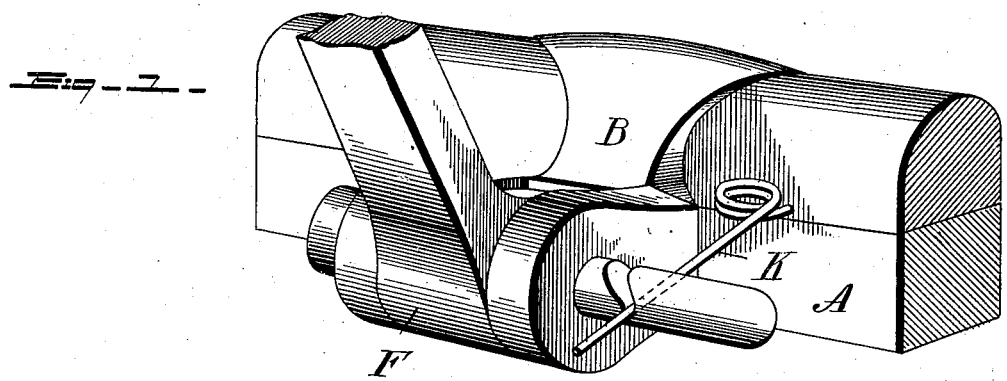
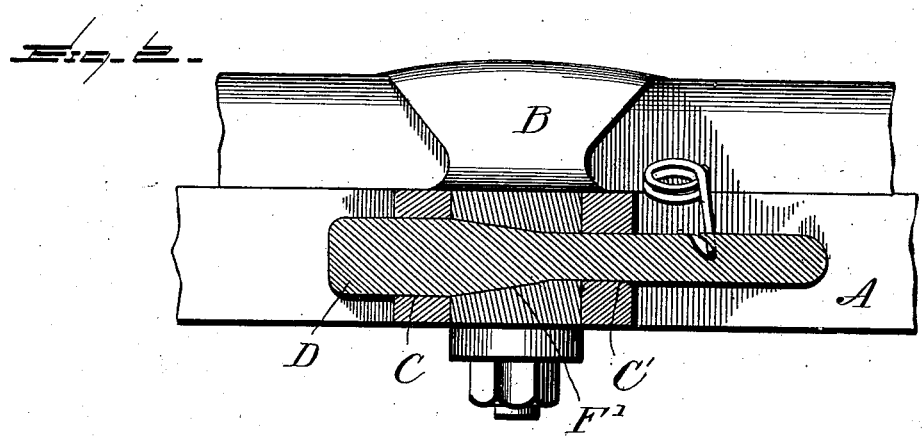
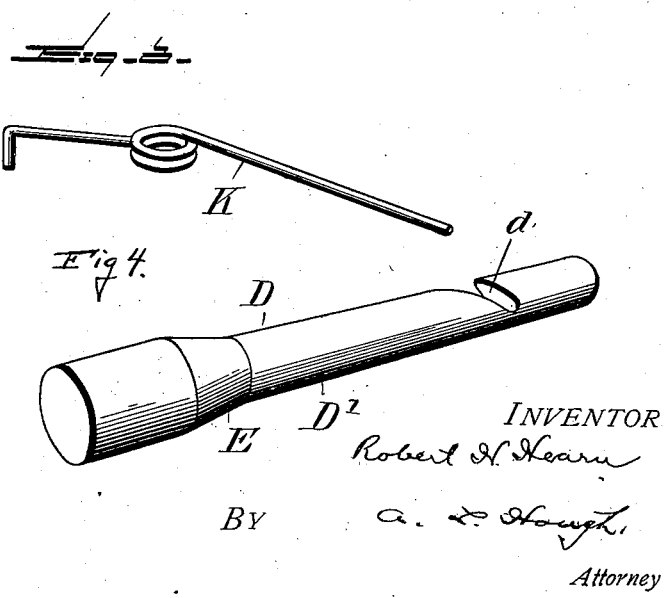
INVENTOR
Robert H. Hearn
BY
Attorney
WITNESSES:

UNITED STATES PATENT OFFICE.

ROBERT H. HEARN, OF DYER, TENNESSEE.

SHAFT-COUPLING AND ANTIRATTLER.

SPECIFICATION forming part of Letters Patent No. 686,454, dated November 12, 1901.

Application filed April 1, 1901. Serial No. 53,861. (No model.)

*To all whom it may concern:*

Be it known that I, ROBERT H. HEARN, a citizen of the United States, residing at Dyer, in the county of Gibson and State of Tennessee, have invented certain new and useful Improvements in Shaft-Couplings and Antirattlers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in shaft or thill couplings and antirattlers combined; and it consists in the provision of simple means whereby a shaft-iron is securely held to a clip on the axle of a vehicle and held from rattling by means of a tapering pin, which is held within the clip by means of a spring carried by the axle and engaging said pin in such manner as to hold the same against the tapering wall of the shaft-iron and to automatically take up wear between the points of contact.

The invention will be hereinafter more fully described and then specifically defined in the appended claims, and is clearly illustrated in the accompanying drawings, which, with the letters of reference marked thereon, form part of this application, and in which—

Figure 1 is a perspective view of my improved shaft or thill coupling and antirattler shown as attached to the clip on the axle. Fig. 2 is a central longitudinal vertical section through the eyes of the clip, the pin carried in said eyes and on which the shaft-iron is mounted, said section being also through the shaft-iron. Fig. 3 is a detail view of the spring, and Fig. 4 is a detail of the pin.

Reference now being had to the details of the drawings by letter, A designates the axle of a vehicle, to which a clip B of any well-known construction is attached in the usual manner. This clip has eyes C and C' of different diameters adapted to receive the pin D. This pin, it will be observed upon reference to the drawings, has one end enlarged and a contracted portion D', which is notched at *d* diagonally with reference to the length of the pin, and the portion of the pin between the enlarged portion and the contracted portion is beveled, as at E. The smaller aperture C' in one of the eyes of the clip is of sufficient size to receive the contracted end of said pin, while the larger aperture C is of sufficient diameter to receive the enlarged end of the pin. When the pin has been passed through the eyes of the clip, it will be observed that the tapering portion of the pin will come between the eyes.

The shaft-iron F has an aperture F' in its end, which aperture has a tapering wall extending partially through the same and merging into a contracted or smaller end which is adapted to receive the contracted end of the pin. The taper or bevel of the inner wall of the shaft-iron conforms to the taper E of the pin, so that when the apertured end of the shaft-iron is placed between the eyes of the clip and the pin inserted through the registering apertures and forced longitudinally toward the smaller apertured eye of the clip the beveled surface of the pin will contact with the beveled or inclined wall of the shaft-iron. In order to hold the pin in place, I provide a spring K, which may be either flat or coiled and secured in any suitable manner to the axle or other fixed portion of the vehicle or clip, said spring having a free end which is adapted to engage in said inclined notch in the pin and to bear yieldingly against the inner end of said notch, whereby said pin may be held yieldingly at its farthest inner limit, and under tension of said spring the beveled portion of the pin will bear with sufficient force against the beveled wall of the shaft-iron to prevent the shaft-iron from rattling. By means of this beveled wall of the shaft-iron it will be observed that all wear incident to the moving of the contact parts of the pin and the shaft-iron will be taken up and any binding of the parts prevented.

From the foregoing it will be observed that my device, owing to its simplicity of construction, may be readily applied to and detached from a vehicle and clip carried by the axle thereon, and when a stiff spring is used it will bear with sufficient frictional pressure against the shaft-iron to hold the shafts in an erect position when not in use.

Having thus described my invention, what I claim to be new, and desire to secure by Letters Patent, is—

1. A shaft-coupling and antirattler for vehicles, consisting in combination with an axle and clip secured thereto, a shaft-iron having an aperture therein, with a conical outlined wall merging into a cylindrical outlined portion, a pin carried by the clip and having portions of its circumference conical and cylindrical, to conform to and engage in said recess of the shaft-iron, and a spring fixed to the axle and adapted to hold the pin yieldingly in contact with the shaft-iron, as set forth.

2. In a combined shaft-coupling and antirattler, the axle and clip secured thereto, eyes of different diameters in said clip, a shaft-iron having an aperture with a beveled wall extending partially through same, a pin having one end enlarged and a contracted shank portion connected by means of the beveled portion, said contracted end having a notched or recessed portion, and a spring fixed at one end to the axle, and having its free end engaging said notched portion of the pin, and adapted to hold the latter so that the beveled portion of the pin will be held in frictional contact with the beveled wall of the aperture in said shaft-iron, as set forth.

In testimony whereof I hereunto affix my signature in presence of two witnesses.

ROBT. H. HEARN.

Witnesses:
R. B. McDaniel,
C. L. Hearn.